US009072276B2

(12) United States Patent
Pechera et al.

(10) Patent No.: US 9,072,276 B2
(45) Date of Patent: Jul. 7, 2015

(54) MODIFIED ANIMAL LITTER

(75) Inventors: Leilani D. Pechera, Kendall Park, NJ (US); Steven T. Adamy, Lawrenceville, NJ (US)

(73) Assignee: CHURCH & DWIGHT CO., LTD., Princeton, NJ (US)

( * ) Notice: Subject to any disclaimer, the term of this patent is extended or adjusted under 35 U.S.C. 154(b) by 349 days.

(21) Appl. No.: 13/423,417

(22) Filed: Mar. 19, 2012

(65) Prior Publication Data
US 2013/0239901 A1 Sep. 19, 2013

(51) Int. Cl.
*A01K 1/015* (2006.01)
(52) U.S. Cl.
CPC .............. *A01K 1/0154* (2013.01); *A01K 1/0155* (2013.01)
(58) Field of Classification Search
USPC ..................... 119/173, 171; 502/81
See application file for complete search history.

(56) References Cited

U.S. PATENT DOCUMENTS

| 2,895,873 | A | 7/1959 | Sawyer et al. |
| 3,029,783 | A | 4/1962 | Sawyer et al. |
| 5,008,226 | A | 4/1991 | Taylor et al. |
| 5,008,227 | A | 4/1991 | Taylor et al. |
| 5,176,879 | A | 1/1993 | White et al. |
| 5,960,743 | A | 10/1999 | Taylor |
| 6,019,063 | A * | 2/2000 | Haubensak et al. .......... 119/173 |
| 6,810,831 | B1 | 11/2004 | Opfel |
| 6,854,421 | B2 | 2/2005 | Opfel |
| 7,468,469 | B2 | 12/2008 | Hollabaugh et al. |
| 7,757,638 | B2 * | 7/2010 | Wang et al. ................. 119/173 |
| 7,793,616 | B2 | 9/2010 | Ikegami |
| 7,856,946 | B2 | 12/2010 | Burckbuchler, Jr. |
| 2006/0088498 | A1 | 4/2006 | Martin et al. |
| 2008/0223756 | A1 * | 9/2008 | Schurz ........................ 208/177 |
| 2009/0117206 | A1 | 5/2009 | Carpenter et al. |
| 2009/0229529 | A1 * | 9/2009 | Burckbuchler, Jr. ......... 119/171 |
| 2010/0083719 | A1 * | 4/2010 | Peppmoller et al. ............. 71/27 |
| 2010/0132619 | A1 * | 6/2010 | Falcone et al. ............... 119/173 |
| 2010/0307422 | A1 * | 12/2010 | Huck et al. .................. 119/161 |
| 2011/0056440 | A1 * | 3/2011 | Burckbuchler, Jr. ......... 119/171 |
| 2012/0202236 | A1 * | 8/2012 | Jollez et al. ................... 435/28 |

FOREIGN PATENT DOCUMENTS

| EP | 1240821 | 1/2007 |
| WO | 200053001 | 9/2000 |

OTHER PUBLICATIONS

Jovanovic & Janackovic, Pore structure and adsorption properties of an acid-activated bentonite, Applied Clay Science, 1991, 59-68, 6, Elsevier Science Publishers B.V., Amsterdam.
E. Gonzalez-Pradas, E. Villafranca-Sanchez, M. Villafranca-Sanchez, F. Del Del Rey-Bueno, A. Valverde-Garcia & A Garcia-Rodriguez, Evolution of Surface Properties in a Bentonite as a Function of Acid and Heat Treatments, 1991, 211-218, 52, J. Chem. Tech. Biotechnol., Great Britain.
S. Mikhail, T. Zaki & L. Khalil, Desulfurization by an economically adsorption technique, 2002, 265-278, Applied Catalysis A: General 227.

* cited by examiner

*Primary Examiner* — Rob Swiatek
*Assistant Examiner* — Morgan T Barlow
(74) *Attorney, Agent, or Firm* — Fishman & Associates, LLC

(57) ABSTRACT

A chemically modified animal litter that is comprised of at least one acid-activated liquid absorbing material and at least one peroxide, wherein the litter provides a surprisingly steady and consistent malodor inhibition.

12 Claims, 4 Drawing Sheets

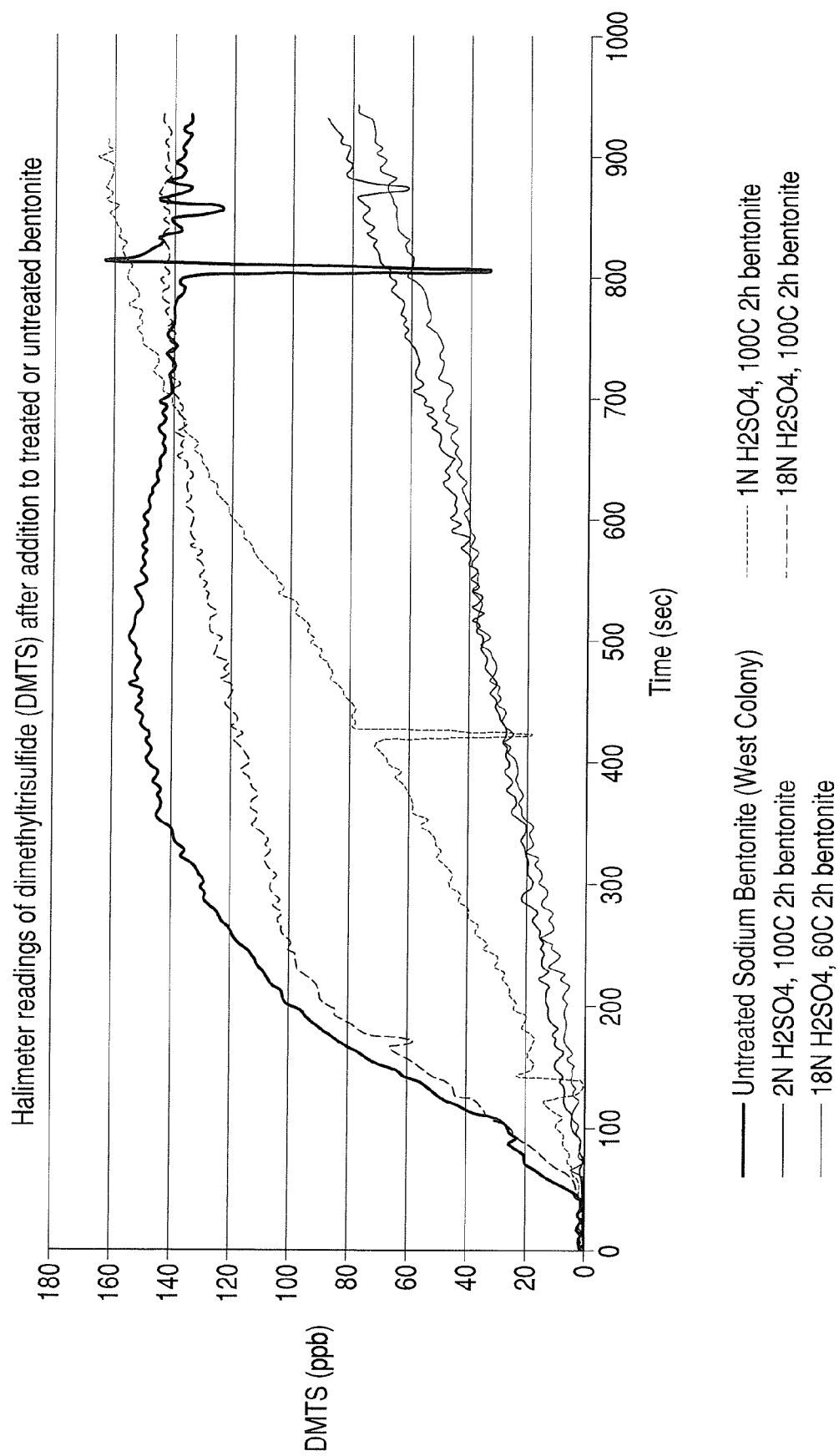

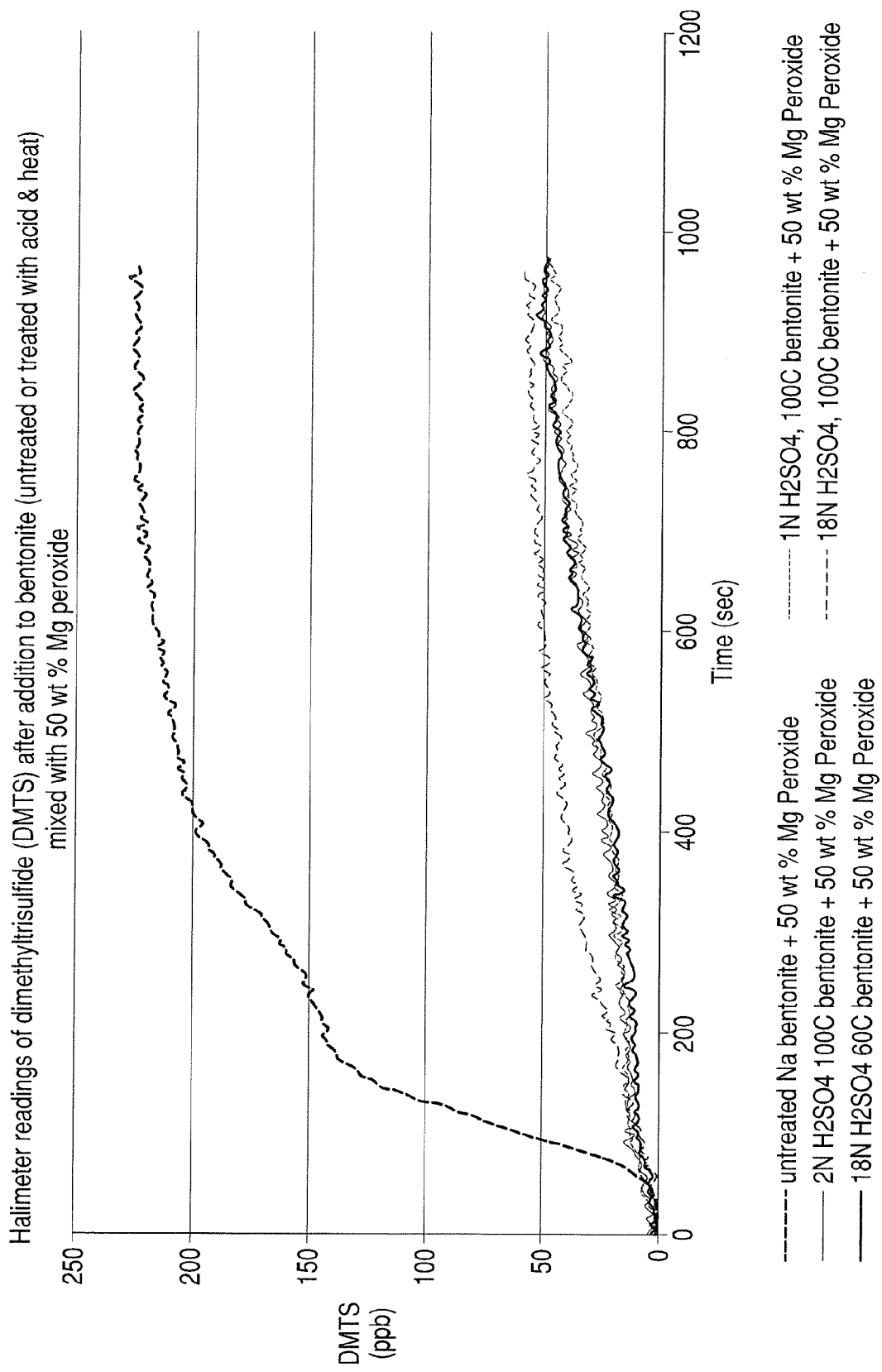

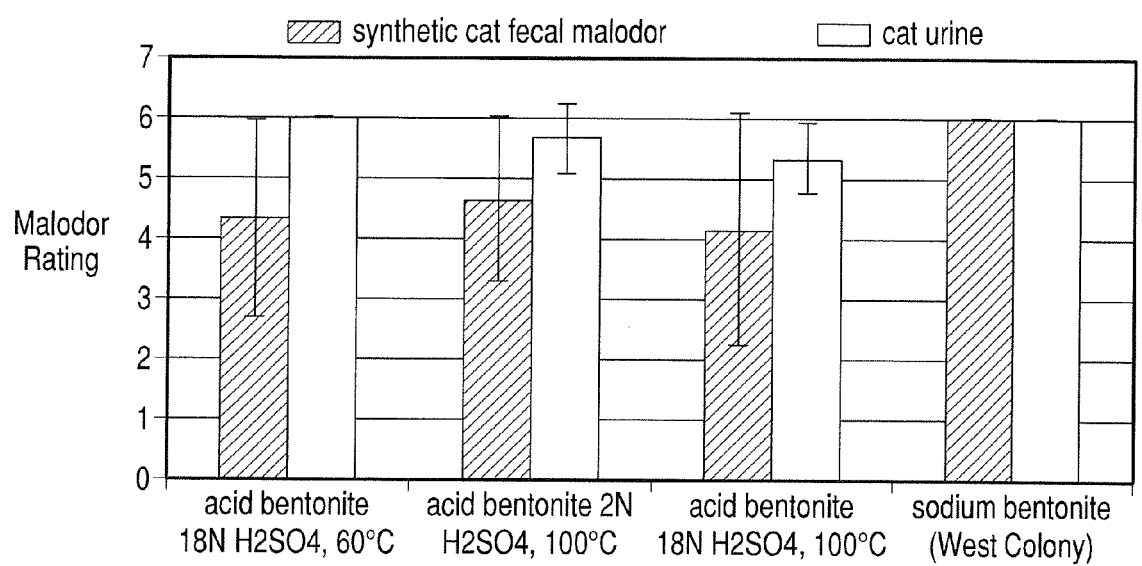

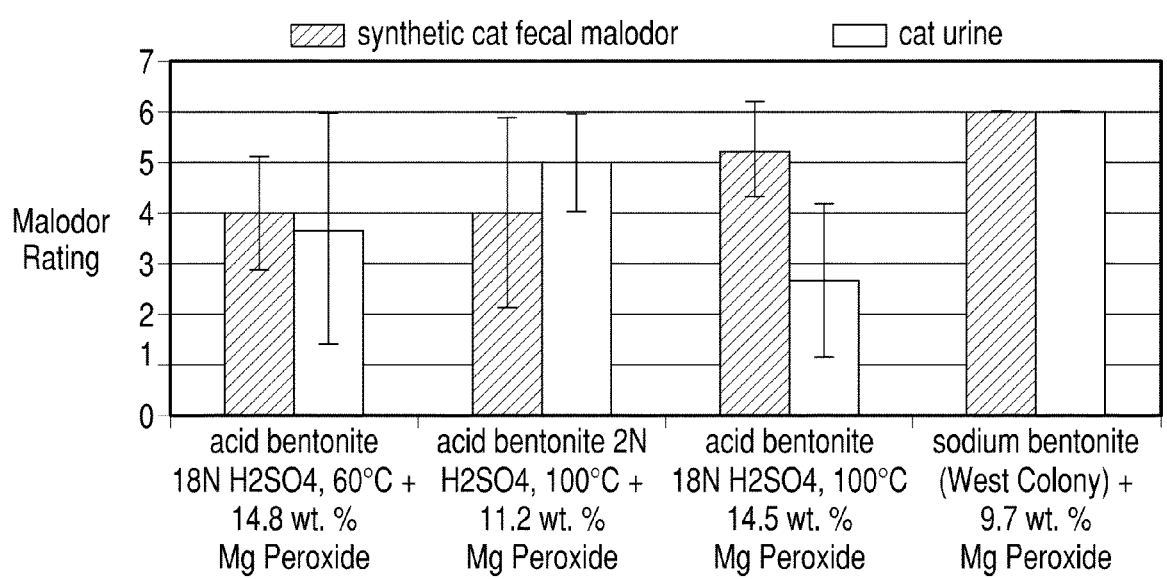

MODIFIED ANIMAL LITTER

FIELD OF THE INVENTION

The present invention relates to animal litters, and in particular to animal litters that have been chemically modified, wherein the litter is found surprisingly effective in mitigating urine and fecal odors.

BACKGROUND OF THE INVENTION

In an effort to efficiently and effectively collect animal urine and/or feces, various methods and compositions are known to utilize absorbent materials in litter boxes and animal cages. In particular, clays (primarily bentonite) have been used as a base material for absorbent animal litters for some time. These materials become tacky when wetted, thereby forming a "clump" that is easily removed from a litter box. Many animals, especially felines, will often refuse to use a litter box that is not kept scrupulously clean. Clumpable animal litters facilitate the ease of cleaning, because otherwise the litter box has to be periodically dumped and refilled to maintain appropriate cleanliness.

Clays such as those based on the clay minerals kaolinite, illite, attapulgite, montmorillonite, sepiolite, diatomite, and the like, have been used extensively in animal litter compositions due to their water and moisture absorbing properties. However these materials have very little, if any, deodorizing properties.

Numerous attempts in prior art to modify liquid absorbing material (i.e. clays) within the litter to optimize its odor-inhibiting property are well known. One example is U.S. Pat. No. 2,895,873 to Sawyer et al., which teaches clay materials that are treated with sulfuric acid to form in-situ certain acidic salts. The treated clays neutralize basic odors that are originated from animal waste or decomposition.

Another example is PCT Application No. WO 0053001 to Simmler-Hübenthal et al., which teaches a litter that contains clays such as bentonite and a solid peroxo compound such as magnesium or calcium peroxide.

Another example is European Patent No. EP 1240821 to Haimerl et al., which teaches an animal litter that includes peroxo compound and calcium bentonite that is treated with hops extract to achieve a beta-acid content of 900 ppm.

In yet another example, U.S. Patent No. 2006/0088498 to Martin et al. teaches an animal litter that contains a solvent-activated reactor. The reactor is formed from a core that contains reactants such as calcium and magnesium peroxide.

Although the above-mentioned litters reduce odors to some degree, it is still desirable to further optimize liquid absorbing materials to achieve drastic reduction of malodors, and to simultaneously provide an economical method to produce such litter.

SUMMARY OF THE INVENTION

The present invention is directed toward a modified animal litter comprising at least one acid-activated liquid absorbing material in combination with at least one peroxide, wherein the litter provides a surprisingly steady and consistent suppression of malodors that are generated from animal waste.

BRIEF DESCRIPTION OF THE DRAWINGS

For a fuller understanding of the nature and advantages of the present invention, reference should be made to the following detailed description read in the conjunction with the accompanying drawings.

FIG. 1A illustrates halimeter readings of dimethyltrisulfide (DMTS) from various bentonite samples that were either not treated or treated with acid & heat at 60° C. and 100° C.

FIG. 1B illustrates halimeter readings of dimethyltrisulfide (DMTS) from bentonite samples (untreated or treated with acid & heat) that were mixed with magnesium peroxide.

FIG. 2A illustrates malodor ratings for various bentonite samples that were either not treated or treated with acid & heat at 60° C. and 100° C.

FIG. 2B illustrates malodor ratings for various bentonite samples (untreated or treated with acid & heat) that were mixed with magnesium peroxide.

DETAILED DESCRIPTION OF THE INVENTION

The present invention is directed toward a modified animal litter comprising at least one acid-activated liquid absorbing material in combination with at least one peroxide, wherein the litter provides a surprisingly steady and consistent suppression of malodors that are generated from animal waste. For the present invention, "acid-activation" and "acid-treatment" are equivalent and used interchangeably.

Liquid Absorbing Material

The liquid absorbing materials that are used in the present invention are chemically modified, and preferably acid-activated.

Commonly used liquid absorbing material for animal litters are clays. The water-absorbent clay component of this invention may be, for example, a clay soil or comminuted rock that contains at least one water swellable clay mineral. Such clay mineral may be, for example, a montmorillonoid or smectite, having a three-layer, sheet structure crystal lattice with two layers of silicon/oxygen tetrahedrons between which is a central layer of aluminum and/or magnesium/oxygen dioctahedrons or trioctahedrons. Part of the silicon in the tetrahedral layers may be substituted with aluminum and part of the aluminum and/or magnesium in the central octahedral layer may be substituted with other elements such as lithium, chromium, zinc, or iron. Contemplated montmorillonoid clay minerals are montmorillonite and nontronite containing a dioctahedral central layer, and hectorite, saponite, and sauconite containing a trioctohedral central layer.

When the foregoing montmorillonoid clay minerals are contacted with water or water vapor, the water molecules penetrate between the layers causing interlayer or intracrystalline swelling and expansion of the entire lattice. This causes the particles of clay component in the animal litter to agglomerate thus facilitating the removal of only that portion of the litter, which is swelled by urine or other aqueous waste liquid.

The often-used clay component of the animal litter of the present invention is a comminuted bentonite, more preferably a sodium bentonite, which contains a preponderant amount of montmorillonite clay mineral. The use of bentonite clays in a variety of applications, such as a component in drilling muds, is well known. Bentonites are economical, readily available clays, with certain forms capable of hydrating and swelling in the presence of water. The swelling properties of bentonite are related to the exchangeable cations present in a particular bentonite ore. The water-swellable bentonite clays contain various exchangeable cations, including sodium, potassium, lithium, ammonium, calcium and magnesium. Although any of these cations can be the predominant exchangeable cation of the bentonite clay of the present invention, bentonite clays often include a variety of exchangeable cations.

The water-swellable bentonite clays useful in the fecal odor absorbent composition of the present invention include any water-swellable bentonite clay that hydrate in the presence of water, e.g., swell in the presence of water. The water-swellable bentonite clay is selected from the group consisting of sodium bentonite, potassium bentonite, lithium bentonite, calcium bentonite and magnesium bentonite, or combination thereof. The bentonite clay can be any member of the dioctahedral or trioctahedral smectite group, or a mixture thereof; examples include Montmorillonite, Beidellite, Nontronite, Hectorite and Saponite, or combinations thereof.

Clays dominate the animal litter market. However, the naturally clumping clays are not the only sorts of water absorbing material useful in the litter. As mentioned above, other water absorbing material may be used as litter such as non-clumping clays, which may or may not be converted to clumping clays with the addition of clumping agents.

These non-clumping clays include Attapulgite, Fuller's earth, calcium bentonite, palygorskite and sepiolite. The Fuller's earth clay, also referred to herein as Fuller's earth or clay, constituent of the compositions of this invention is a natural, earthy material composed primarily of hydrous aluminum silicates, while small amounts of non-clay materials can also be present. Calcium bentonites can range in color from a cream, off-white to a dark reddish tan color and are frequently referred to in the trade under designations such as Mississippi Brown and Mississippi White. These animal litter clays can be divided into heavy weight clays and lightweight clays. Fuller's earth and calcium bentonite are heavy weight clays. Sepiolite and attapulgite (palygorskite) are lightweight clays.

Other clays useful as the liquid absorbing material in the litter of this invention may include kaolinite, illite, halloysite, hormite, vermiculite or mixtures thereof.

The acid-activation of the liquid absorbing materials, such as clays, is achieved by first mixing acidic materials with the liquid absorbing materials, heat-treating the mixture, then filtering and drying the treated solids.

It is believed that the acid treatment of clay materials such as bentonite results in a replacement of exchangeable and structural cations ($Na^+$, $Ca^{2+}$, $Mg^{2+}$, $Al^{3+}$, and $Fe^{3+}$) with protons ($H^+$). The removal increases the number of surface acid centers and micropore volume. The acids also partially disrupt the octahedral sheet within bentonite to increase the surface area. It is also believed that the increase in acid sites disturbs the charge equilibrium in the bentonite-clay lattice, thereby creating strain that arises to new active adsorption sites to bind to the components within malodors, such as basic sulfur compounds. The acidic materials that are useful for the present invention are inorganic acids such as boric acid, $H_2SO_4$ or HCl, or organic acids such as sulfonic and carboxylic acids. The preferred acids are $H_2SO_4$ and HCl. The applicable concentration of $H_2SO_4$ is about 0.25 to 18 N, preferably about 1 to 18 N, and more preferably about 2 to 18 N. The applicable concentration of HCl is about 0.5 to 4 M, preferably about 1 to 4 M, and more preferably about 2 to 4 M. Overall, the amount of the acid solution that is used to treat the liquid absorbing material is about 5 to 60 wt %, preferably about 10 to 60 wt. % of the acid/liquid absorbing material mixture. In general, an increase of the acid concentration increases the total pore volume of the treated clay materials.

The subsequent heat treatment of the acid/clay mixture removes any residual water molecules that can block the absorption sites. According to the type of acid that is used, the heat treatment temperature can be as low as 60° C. to as high as 400° C. If $H_2SO_4$ is used, a heat treatment at 100 to 400° C., preferably at 110 to 200° C. is applicable. If HCl is used, a heat treatment at 70 to 200° C., preferably 74 to 110° C. is applicable. In general, the liquid absorbing material is heat-treated with the acid for about 20 minutes to about 5 hours, preferably 30 minutes to 3 hours, and most preferably until the liquid absorbing material/acid mixture reaches its boiling point.

After the heat treatment, the aqueous acid layer is decanted and the acid/clay mixture is subjected to a series of washes to remove residual aqueous acid. In general, it is preferred to use a low concentration of acids in conjunction with a high heating temperature, because less wash is then required to remove the residual aqueous acid from the treated clay materials. After the washes, the mixture is filtered and dried at 110° C. for at least two hours until dry to obtain the acid-activated clay material. The dried and acid-activated clay material has a pH of about 2 to about 6.5, preferably about 2 to 5.

The acid-activation is not limited to the acid-activation of bentonite. Acid-activated kaolinite, montmorillonite, hormite or attapulgite are also applicable to the present modified animal litter. The present modified animal litter may also contain multiple types of clay materials, each of which can be acid-activated by the same or different types of acid.

Peroxides

Peroxides such as alkaline earth metal peroxides (e.g. magnesium peroxide or calcium peroxide) are incorporated into the modified litter, and they are known for bleaching, disinfecting, and deodorizing. The peroxides release hydrogen peroxide ($H_2O_2$) upon contact with an acid:

$$MO_2 + 2H^+ \text{ (aqueous)} \rightarrow M^{2+} \text{ (aqueous)} + H_2O_2$$

The released hydrogen peroxide inhibits the growth of microbes, such as the microbes that produce malodor from urine. Different alkaline earth metal peroxides have different hydrogen peroxide release profiles. For example, magnesium peroxide ($MgO_2$, technical grade) has a slower release rate of hydrogen peroxide at a higher pH of about pH 8.5 to 10, but high release rate (>80%) at about pH 6.3. Meanwhile, calcium peroxide ($CaO_2$, technical grade) has a steep release rate of hydrogen peroxide (≤80% to 5%) at a higher pH of about 8.5 to 10, with close to zero or minimal release beyond pH of 10.

Therefore it is desirable to place the peroxide in a low pH environment to release hydrogen peroxide. Either powder or granulated peroxide can be mixed with at least one liquid absorbing material to produce the modified animal litter.

Although the above discussion is focused on peroxide compounds comprised of alkaline earth metal peroxide, it is possible that other inorganic or organic peroxides, or peroxide adducts may also be used as a replacement for or in addition to the alkaline earth metal peroxide. An example of organic peroxide includes benzoyl peroxide. Examples of inorganic peroxides include barium peroxide and manganese peroxide. An example of a peroxide adducts include urea peroxide.

Optional Components

The modified litter optionally includes filler, a clumping agent, a de-dusting agent and/or fragrance. The filler is incorporated with the clay materials to reduce the cost of the litter without significantly decreasing the material's performance as a litter. Useful filler is selected from materials such as limestone, sand, calcite, dolomite, recycled waste materials, zeolites, and gypsum.

The clumping agent can be added to liquid absorbing materials that are non-clumping in nature. Suitable clumping agents include, but are not limited to, clumping clays, polysaccharides, water-soluble gums, dry particulate cellulosic ethers and water absorbent polymers, or mixture thereof. Clumping agents promote adhesion of the fine size particles of litter substrates to each other as well as promoting adhesion of the granules to form agglomerate when wetted. Preferably, the clumping agent allows the formation of gelled agglomerate when exposed to a liquid, such as animal urine.

The de-dusting agent is selected from water-soluble polymeric resins, e.g., polyvinyl alcohol, polyvinyl acetate, polyvinyl pyrrolidone, polyacrylic acid, guar gum, xanthan gum, gum arabic, other natural resins and mixtures of any of these resins. If a fragrance is utilized, an amount of fragrance in an acceptable range, typically from 0.1-10%, can be employed. The fragrance could be added to the absorbent composition during the process of making the composition or after the absorbent composition is made.

Formulations

The modified litter is comprised of a liquid absorbing material and at least one peroxide, in order to provide a steady and consistent malodor inhibition.

The liquid absorbing material that is used within the modified litter is preferably an acid-activated clay in the amount of 50 to 90 Wt. %. An amount of 50 to 86 Wt. % is also useful. The peroxide is present in an amount about 10 to 50 Wt. % of the modified litter. An amount of from 14 to 50 Wt. % is also useful.

Alternatively, the modified litter is comprised of peroxide, and a liquid absorbing material that is a mixture of an acid-activated clay and at least one regular, non-acid activated liquid absorbing material. The acid-activated clay is present in a minor amount, for example, 5 to 50 wt. % or preferably 10 to 50 wt. %, of the total liquid absorbing material. The non-acid activated liquid absorbing material is selected from the materials as described in the "Liquid Absorbing Material" section. The minor amount of acid-activate clay, in combination with peroxide also contributes to good malodor inhibition.

The peroxide is either blended uniformly with the liquid absorbing materials with a blender then used as is, or the mixture is blended then compacted and subsequently broken into particulate forms. The compaction places the peroxide in a close proximity to the acid-treated clay particles, to allow the peroxide to interact with the protons and residual acid within the liquid absorbing material. This interaction releases hydrogen peroxide from the peroxide for the modified animal litter. Meanwhile, the size-reduction of the compacted form increases the surface area of the particulates to bind malodor molecules. However, it must be noted that besides compaction, any other method that places peroxide in a close proximity with the acid-treated liquid absorbing material is also applicable for the present invention.

Method of Use

Solid waste such as feces is in full contact with the modified litter on at least one surface or phase, with the remaining surface area of the feces covered with at least 10% of the modified litter.

The modified litter of this invention may be used for a wide variety of animals and birds, e.g., un caged household pets such as cats and dogs, particularly puppies too young to be walked, caged pets such as hamsters, gerbils and rabbits, caged laboratory animals such as guinea pigs, mice, rats and monkeys, animals raised for fur such as mink, barnyard birds such as chickens, ducks and geese, and pet birds such as parrots, parakeets, canaries and pigeons. The compositions of this invention are particularly suitable for use as cat litters.

EXAMPLE 1

Preparation of Acid-Activated Bentonite

West Colony sodium bentonite (325 g) was added equally to two sets of flasks. Each set contained three 5-liter round bottom flasks, and each flask contained respectively 4 liters of 1 N, 2 N, or 18 N of sulfuric acid with a stir bar. Each flask was attached to a condenser in a reflux set-up and one set was heated to 60° C., while the second set was heated to 100° C. for 2 hrs with stirring. The heating was accomplished with a temperature-controlled heating mantle and a stir plate. After cooling, the mixture was decanted to remove the acidic aqueous layer. The remaining mixture from each flask was separately washed with deionized water and filtered by suction filtration. The final filtrate after 3 washings showed a pH of 2 using a pH meter. The solids were dried in an oven at 110° C. for 2 hrs or until dry.

Halimeter Testing of Acid-Activated Bentonite±Mg Peroxide Against Sulfur Malodor The acid-activated bentonite; with or without magnesium peroxide (1:1 w/w), was admixed with dimethyltrisulfide (also known as "DMTS", a component of cat urine and fecal malodors). DMTS emission from each sample was then taken as a measurement of malodor inhibition. The lower DMTS emission, the more effective the sample is for malodor inhibition.

First a solution of DMTS was prepared. Briefly, DMTS (0.1 g) was added to 9.9 g Tergitol NP9 in a vial and vortexed quickly. An aliquot (0.1 g) of the DMTS/NP9 mixture was added to a 9.9 ml (pH 6) phosphate buffer in another vial and vortexed quickly, in order to obtain a 100 ppm DMTS solution. The buffer was prepared by adding 100 ml of 0.1 M $KH_2PO_4$ to 14 ml of 0.1 M $KH_2PO_4$. Due to the volatility of DMTS, it had to be freshly prepared in a surfactant-buffer system prior to its addition in the acid-treated bentonite samples and the control (untreated bentonite). Granulated magnesium peroxide was blended uniformly throughout the acid-activated bentonite.

A 0.5 ml of the 100 ppm DMTS solution was gradually added to each bentonite sample (7 grams), and the bentonite was placed inside a closed chamber (Plas Labs 860-CG) for 15 minutes. The chamber was also attached to a Halimeter (Interscan) equipped with a data recorder (Monarch Data Chart 2000). The bentonite samples included acid-activated bentonite (prepared using different concentrations and/or heating temperatures), and acid-activated bentonite samples that contained magnesium peroxide (1:1 w/w). The controls included untreated sodium bentonite with and without magnesium peroxide (1:1 w/w). Halimeter results from FIG. 1A showed lower DMTS concentrations were detected for the acid-activated bentonite as compared to the untreated sodium bentonite. Specifically, as compared to the untreated bentonite, bentonite that was treated with 2N $H_2SO_4$ at 100° C., and the bentonite that was treated with 18N $H_2SO_4$ at 60° C. effectively reduced as much as 70% the DMTS emission in ppb at the 10-minute mark.

However, a greater and more consistent malodor inhibition was observed from the treated bentonite samples that were admixed with magnesium peroxide (1:1 w/w). FIG. 1B demonstrated that at the 3-minute mark, as much as 90% of the DMTS emission was reduced from these samples as compared to the untreated bentonite with magnesium peroxide (1:1 w/w). Furthermore, about 88% of the DMTS was reduced at the 5-minute mark, about 84% of the DMTS was reduced at the 10-minute mark, and about 78% of the DMTS was reduced at the 15-minute mark. Overall, all acid-treated bentonite samples that were admixed with magnesium peroxide provided a steady and consistent malodor inhibition, for a span of about 15 minutes.

EXAMPLE 2

Sniff Testing of Acid-Activated Bentonite Added With Cat Urine and Synthetic Cat Fecal Malodor Acid-activated bentonite (60 ml) samples that were prepared from Example 1 were each placed in a 8 oz. glass jar with and without 10 v/v %, magnesium peroxide, and the jar was covered with aluminum foil and with holed caps.

Controls in this example included untreated sodium bentonite with and without 10 v/v %, magnesium peroxide. Cat urine from Sharp Veterinary Research (Texas) was utilized and synthetic cat fecal malodor was prepared. For the cat urine malodor test, the processed cat urine was heated to 35° C. then added to the litter jars each day for three days (5 ml/jar/day) using a 60 ml syringe. Seven panelists rated the malodor at Day 5 (Day 1=first addition of urine) relative to the controls. For the cat fecal malodor test, 1 drop (~0.03 g) of synthetic fecal malodor was combined with 5 grams of synthetic feces substrate and added to the litter jars (the litter samples covered the surfaces of the synthetic feces but the feces were not buried in the litter). Three panelists rated the malodor on the same day. Malodor ratings were: no malodor=0, very slight malodor=1, slight malodor=2, moderate malodor=3, slightly strong malodor=4, strong malodor=5, very strong malodor=6.

FIG. 2A showed slightly lower malodor ratings for the acid-activated bentonite as compared to the control bentonite after their treatments with cat urine and synthetic cat fecal malodor (A score of 6 of the control vs. a score of 4.2 for feces and a score of 5.5 for urine). However, significantly lower malodor ratings were observed with the addition of magnesium peroxide (FIG. 2B). Specifically, the control (bentonite with magnesium oxide) had a score of 6, while the treated bentonite samples had a score as low as 2.8 for urine and a score of 4 for feces.

The invention claimed is:

1. A modified animal litter comprising at least one acid-activated liquid absorbing clay material in an amount of 50 to 90 wt. % of said litter, and at least one peroxide present in an amount of 10 to 50 wt. % of said litter.

2. The modified animal litter of claim 1, wherein said at least one acid-activated liquid absorbing clay material is an acid-activated bentonite, kaolinite, montmorillonite, hormite, attapulgite or mixtures thereof.

3. The modified animal litter of claim 2, wherein said at least one acid-activated liquid absorbing clay material is an acid-activated bentonite.

4. The modified animal litter of claim 1, wherein said at least one peroxide is an inorganic, organic or alkali earth metal peroxide.

5. The modified animal litter of claim 4, wherein said alkaline earth metal peroxide is selected from magnesium peroxide and calcium peroxide.

6. The modified animal litter of claim 1, wherein said at least one acid-activated liquid absorbing clay material has a pH of between 2 and 6.5.

7. The modified animal litter of claim 6, wherein said at least one acid-activated liquid absorbing clay material has a pH of between 2 and 5.

8. The modified animal litter of claim 1, wherein said at least one acid-activated liquid absorbing clay material is present in an amount of 50 to 86 wt. % of said litter.

9. The modified animal litter of claim 1, wherein said at least one peroxide is present in an amount of 14 to 50 wt. % of said litter.

10. The modified litter of claim 1, wherein said modified litter expresses at least 75% malodor inhibition consistently for about 15 minutes.

11. The modified litter of claim 1, wherein said litter further includes a clumping agent.

12. The modified litter of claim 1, wherein said litter further includes at least one non-acid activated liquid absorbing material.

* * * * *